May 17, 1960     W. D. G. GREENHALF ET AL     2,936,642
ELECTRO-MECHANICAL SERVO DEVICES
Filed May 1, 1956

WILLIAM D.G. GREENHALF
IVAN ALFRED DUCK
Inventors

By Darby & Darby
Attorneys

United States Patent Office 2,936,642
Patented May 17, 1960

2,936,642

ELECTRO-MECHANICAL SERVO DEVICES

William D. G. Greenhalf and Ivan A. Duck, Aylesbury, England, assignors to General Precision Systems Limited Application May 1, 1956, Serial No. 582,007

Claims priority, application Great Britain May 4, 1955

5 Claims. (Cl. 74—377)

This invention relates to electro-mechanical servo devices of the clutch type, i.e. comprising two driving members in the form of selectively energised electromagnets rotating continuously in opposite senses on a common axis, and an interposed driven member in the form of a disc or annulus, incorporating magnetic material, which is drawn against and driven by whichever driving member, if any, which is energised at any time.

Devices of this type have the merits (as compared with speed-controlled motors) that the mass to be accelerated and retarded can be very small and that the steadily rotating mass of the driving members, and of the means driving them, forms a substantial reservoir of kinetic energy for accelerating and retarding the driven parts. Thus such servos can have an exceptionally rapid response and can faithfully follow without appreciable lag electrical control signals liable to sharp variation. This is of particular advantage in achieving sensitivity without instability in such applications as electrical analogue computing systems.

It is the principal object of the present invention to provide improvements in the reliability and life of servo devices of the type in question. Other objects will be obvious and will become apparent as the description proceeds.

According to one feature of the invention, the driven member comprises two discs or annuli axially separated in the manner of flanges of a spool or pulley, the two driving members being correspondingly spaced and closely adjacent respectively to the outer faces of the driven discs. This arrangement contrasts with conventional arrangements, in which the driving members are adjacent to opposite faces of a single driven disc. Investigation of defects in this latter type has shown them to be in large measure due to the driving members being close enough together to be in range of each other's magnetic field. Consequently when either is energised they are drawn together and so both tend to drive the interposed driven member, with consequent rapid wear and indeterminacy of action. Initially this may not happen, if slight axial spacing of the three parts prevents the driven disc from being in contact simultaneously with both driving members; however the constantly-running bearings of the device will inevitably wear and soon permit enough relative axial movement of the three members for this no longer to apply. If allowance is made for this by increasing the initial axial clearances between the members, the driven disc has to execute a correspondingly larger shift or flexure into driving contact with the energised driving member, which introduces an undesirable delay or lag into the operation of the servo, and which may require greater power for energizing the magnetizing windings.

This defect is overcome in a servo according to the invention, since the driving members do not attract each other, and this cause of axial wear in their bearings is removed. Moreover, such wear as does occur cannot have the deleterious effect above described since it is now impossible to have magnetic adherence of both driving members simultaneously to the driven disc, even if they are simultaneously touching it. Consequently, the servo will operate indefinitely with the driven member just brushing the two driving members, which is a condition for maximum efficiency and rapidity of response.

According to a further feature of the invention, each of the driving members comprises a stationary and a rotating portion. The stationary portion houses the electrical windings, and the rotating portion (which drives the driven disc when required) incorporates magnetic material and is so shaped and closely interposed between the winding housing and the disc as to transmit adequately the magnetic flux generated by the winding when energised.

Since the winding is now stationary, its design and construction are unhampered by such requirements as mass balance and strength against centrifugal forces, and it is relatively easy to arrange for it to be withdrawn and replaced. This facility is valuable not only in cases of electrical breakdown, but also where one wishes to change it for a winding of different impedance, as may for example occur where servos are controlled by electronic computing circuits.

An additional advantage of this feature is the elimination of electrical slip-rings to the windings; these are notoriously a source of weakness in such devices, and can also give rise to electrical "noise" which is objectionable in computing circuits.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

A practical embodiment of the invention will now be particularly described by way of illustration only, with reference to the accompanying drawings, in which.

Figure 1:
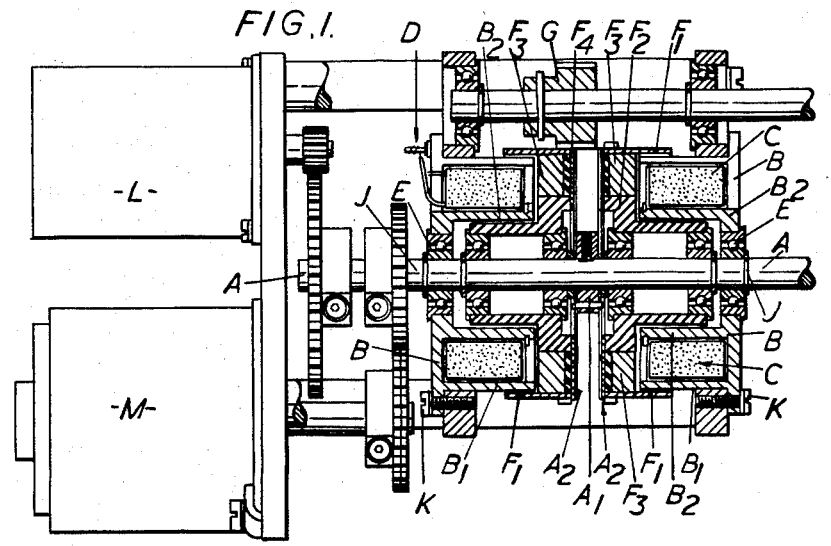
Figure 1 is a side elevation with the working parts in section.

Referring to Figure 1, the driven shaft A has pinned to it a central boss $A_1$ carrying the two axially spaced driven discs $A_2$. Each of these comprises a thin disc of beryllium copper having riveted to its outer face a thin flat annulus of a suitable magnetic alloy. That part of the copper disc near the centre is formed with arcuate overlapping slots to give the disc flexibility in a direction perpendicular to its own plane, this being a construction analogous to that frequently adopted for the suspension of the moving coils of loudspeaker assemblies.

The electro-magnet proper of each of two similar driving members comprises an annular base B with two co-axial cylindrical walls $B_1$ and $B_2$ between which the electrical winding C is laid. This assembly carries terminals D through which the winding may be energised; the outer rim of its base B is secured to the general frame structure of the servo and its inner rim carries a ball bearing E in which the rotatable driven shaft A is located. The rotated portion of each driving member comprises two concentric sleeves $F_1$ and $F_2$ of magnetic material with an annulus $F_3$ of brass sandwiched between them and faced with a covering $F_4$ of material for frictionally engaging the adjacent clutch disc A. Each rotatable portion is located by means of two ball bearings on the driven shaft in such a manner that its outer and inner sleeves $F_1$, $F_2$ of magnetic material closely embrace the two cylindrical walls $B_1$, $B_2$ forming the body of the stationary electro-magnet. The outer face of the rotary driving member is formed flat and is normally in light rubbing contact with the adjoining disc $A_2$ of the driven member.

Figure 2:
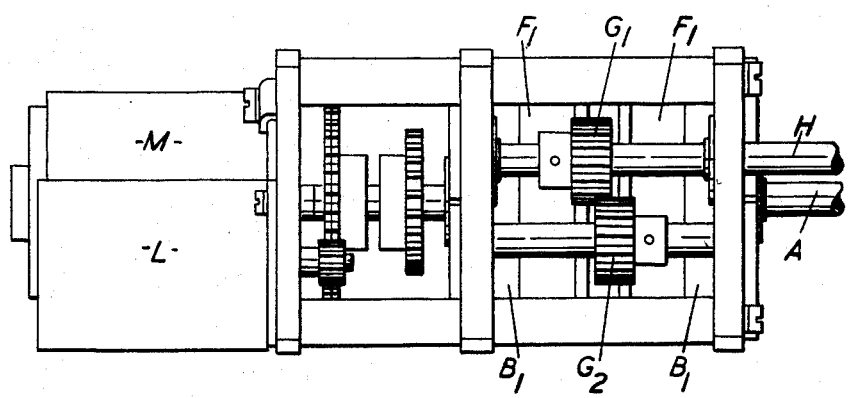
Figure 2 is a plan view.

The periphery of each rotary driving member is toothed, and the one meshes with a pinion $G_1$ on the driving shaft H which is steadily rotated by a suitable motor (not shown). As is evident from Figure 2 this pinion meshes with a similar pinion $G_2$ on an idler shaft, the latter in turn meshing with the toothed periphery of the other of the rotary driving members, so that the two driving members are steadily rotated in opposite senses.

With this arrangement, excitation of a winding C produces opposite poles at the free edges of the two stationary walls $B_1$, $B_2$ between which it is laid, and the magnetic flux path between these poles is completed via the inner sleeve $F_2$ of the rotating member, the magnetic annulus on the adjacent driven disc $A_2$, and the outer sleeve $F_1$ of the rotating member. When this happens, the tendency of this magnetic path to shrink produces an immediate frictional adherence between the rotary driving member and the respective driven disc without requiring any appreciable axial movement of the latter. As previously explained, the separation between the two driven discs is sufficient to keep the "forward" and "reverse" driving systems magnetically separate so that each driven disc can have the minimum of clearance from its driving member without any risk of the driven assembly being nipped between the oppositely rotating driving systems.

It will be evident from Figure 1 that by removing a retaining clip J and undoing securing screws K, either winding assembly can readily be withdrawn without disturbing the assembly or alignment of the rotary driving and driven members and their shafts.

In the particular example illustrated, the driven shaft A is shown as geared to a tachometer generator L for providing a voltage proportional to the speed at which that shaft is moving and an electrical potentiometer M for providing the voltage representing the amount of revolution which the driven shaft has made. These two driven elements would normally be incorporated in a servo intended for use in electrical analogue computer systems, but are here shown only as examples of devices which may be driven by the servo.

The construction of the driven discs $A_2$ and of the rotary driving members $F_1$, $F_2$, $F_3$ can be modified to suit particular circumstances, as will be understood. Furthermore, the means for driving the rotary members, $F_1$, $F_2$, $F_3$ can be varied. Other changes will now be obvious as a result of the above disclosure, and the scope of the present invention is to be interpreted to be limited solely in accordance with the language of the accompanying claims.

We claim as new and desire to secure by Letters Patent:

1. An electro-mechanical servo device comprising two oppositely-rotatable driving members and a common driven axially-fixed output shaft member that can be driven in either direction by magnetizing one of the driving members and thereby causing the driven member to be drawn against and driven by that driving member, wherein the driven member comprises two flexible discs which are axially spaced apart, the driving members being spaced at a fixed axial distance and each placed closely adjacent to one of the driven discs, and wherein each driving member comprises an electromagnet having a stationary winding and a rotatable core portion which drives the disc when the winding is excited.

2. An electro-mechanical servo device as claimed in claim 1 wherein the rotatable core portion co-operates with a stationary core portion which completes the magnetic circuit with which the winding is linked.

3. An electro-mechanical servo device as claimed in claim 1 wherein the rotatable core portion comprises inner and outer concentric annular magnetic bodies attached to and spaced apart by a nonmagnetic metallic spacing ring having a covering of material for frictionally engaging the driving member.

4. An electro-mechanical servo device comprising a rotatably driven axially-fixed output shaft member, two magnetizable flexible disc members carried by said driven member in spaced-apart positions coaxial therewith, two magnetizable driving members mounted for rotation in opposite directions coaxially with said driven member and each positioned closely adjacent one of said disc members for co-operation therewith, and separately energizable magnetizing means for each of said driving members, each magnetizing means being effective when energized for causing one of said flexible discs to be magnetically attracted into driving engagement with its co-operating driving member, said axially-fixed output shaft member extending coaxially through said flexible disc members, said magnetizable members and said separately energizable magnetizing means.

5. An electro-mechanical servo device comprising a rotatably driven axially-fixed output shaft member, two magnetizable flexible disc members carried by said driven member in spaced-apart positions coaxial therewith, two magnetizable driving members mounted for rotation in opposite directions coaxially with said driven member and each positioned closely adjacent one of said disc members for co-operation therewith, and separately energizable magnetizing means for each of said driving members, each magnetizing means being effective when energized for causing one of said flexible discs to be magnetically attracted into driving engagement with its co-operating driving member, said two magnetizable driving members being located axially at least partially in between said separately energizable magnetizing means, and in which said magnetizing means comprises separate stationary electro-magnet coils.

References Cited in the file of this patent

UNITED STATES PATENTS

| | | |
|---|---|---|
| 2,253,309 | Smellie | Aug. 19, 1941 |
| 2,595,190 | Edwards | Apr. 29, 1952 |
| 2,697,812 | Kammerer | Dec. 21, 1954 |